(12) United States Patent
Okazaki

(10) Patent No.: US 6,862,260 B2
(45) Date of Patent: Mar. 1, 2005

(54) CORRECTION METHOD, CORRECTION CIRCUIT, AND LIGHT INFORMATION STORAGE APPARATUS

(75) Inventor: Nozomu Okazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 10/624,119

(22) Filed: Jul. 21, 2003

(65) Prior Publication Data

US 2004/0017744 A1 Jan. 29, 2004

Related U.S. Application Data

(63) Continuation of application No. PCT/JP01/00753, filed on Feb. 2, 2001.

(51) Int. Cl.[7] .................................................. G11B 7/00
(52) U.S. Cl. ............................. 369/124.01; 369/44.27; 369/44.32
(58) Field of Search ........................ 369/44.27, 44.28, 369/44.29, 44.34, 44.32, 44.35, 44.41, 47.1, 53.1, 59.1, 124.01, 124.1, 124.15

(56) References Cited

U.S. PATENT DOCUMENTS 5,343,454 A * 8/1994 Watanabe et al. ......... 369/44.32
5,953,296 A * 9/1999 Baba ....................... 369/44.32

FOREIGN PATENT DOCUMENTS

| JP | 62-107444 | 5/1987 |
|---|---|---|
| JP | 2-027401 | 1/1990 |
| JP | 11-238330 | 8/1999 |

* cited by examiner

Primary Examiner—Muhammad Edun
(74) Attorney, Agent, or Firm—Greer, Burns & Crain, Ltd.

(57) ABSTRACT

The correction method of the present invention includes a step for respectively inputting a same-signal pair composed of two signals each having the same signal waveform to two input lines of a normalization circuit, and then adjusting the difference between the values of the two offset signals added to those two input lines to make the output of the normalization circuit fixed or coincide with a predetermined value. The correction method further includes a step for respectively inputting to the two input lines of the normalization circuit a fixed-ratio-signal pair composed of two signals in which the ratio between the amplitudes of waveforms is fixed, and then adjusting each of the two offset signals added to those two input lines while the difference between the values of the two offset signals is maintained as is, to make the output of the normalization circuit fixed or coincide with a predetermined value.

6 Claims, 11 Drawing Sheets

CORRECTION METHOD, CORRECTION CIRCUIT, AND LIGHT INFORMATION STORAGE APPARATUS

This is a continuation of International patent application No. PCT/JP01/00753, filed Feb. 02, 2001.

TECHNICAL FIELD

The present invention relates to a correction method and correction circuit each of which corrects the error of a normalization circuit, and a light information storage apparatus equipped with the normalization circuit.

BACKGROUND ART

In a light information storage apparatus such as an optical disk apparatus, a laser light is condensed and radiated onto an information storage medium such as an optical disk. The light that has been obtained by that laser light's being reflected from the information storage medium, or the light that has been obtained by that laser light's being diffracted by the information storage medium, or the like, is received by a photodetector. This photodetector is divided into at least two detection parts, and, by each of the respective detection parts, the light is converted into a corresponding electric current signal. By determining the sum of, or the difference between, those electric current signals, there is obtained a track error signal (Track Error Signal: TES) or a focus error signal (Focus Error Signal: FES) or the like. By using those signals such as a track error signal, focus and tracking are controlled.

In, for example, a method of obtaining a track error signal called "the Push-Pull Method", there are utilized ±primary diffracted light rays that are obtained when a laser light has been radiated onto the track guide groove on a relevant optical disk. The relative intensities of respective ones of the ±primary diffracted light rays vary depending on the state of the laser light spot's being applied to the track guide groove. Therefore, by the ±primary diffracted light rays' being respectively received by the two-divided photodetector and converted into respective electric current signals and by being determined the difference between those electric current signals, a track error signal is obtained.

Meanwhile, in the light information storage apparatus accessing a rewritable type optical disk, a more intense light is radiated onto the optical disk when performing write-in or erasure than when performing read-out. For this reason, the level of the electric current signal obtained from the photodetector greatly fluctuates when the write-in or erasure operation is switched to the read-out operation or vice versa.

Also, in a case, as well, where a change in the amount of light occurs due to the variation in the reflectance of the optical disk, the signal level of the electric current signal obtained from the photodetector fluctuates.

In the light information storage apparatus accessing an optical disk that is rotated with the angular velocity thereof being fixed, since the linear velocity is different between the inner periphery and the outer periphery, the intensity of the laser light is varied in harmony with the change in the linear velocity. Also, in a general type light information storage apparatus, in order to make the writing-in ability stable, the intensity of the laser light that is used when performing write-in is adjusted to a value corresponding to the environmental conditions such as temperature.

Accordingly, when the difference signal between the two photodetector outputs is simply used as a track error signal, the control becomes unstable when the level of the electric current signal changes due to the change in the intensity of the laser light or the change in the amount of it.

In view of the above, conventionally, a normalization circuit is incorporated into the optical disk apparatus, and, by the normalization circuit, the track error signal is normalized. Into this normalization circuit, two input signals are input, and the difference signal between those two input signals is divided by the sum signal between those two, thereby normalization is performed. As a result of this, there is obtained a track error signal wherein the levels of the input signals have on principle been canceled.

Normalization like that is performed also when determining a focus error signal or the like.

By the way, in the normalization circuit, it is known that a predetermined error which is specific for each relevant circuit occurs not only when the circuit receives the input signals but also when the circuit determines the difference signal and sum signal. The predetermined error like that has effects upon the result of the normalization calculation and produces the normalization error. Normalization error like that has hitherto been ignored.

However, in optical disks which have been widely used in recent years, the track pitch has been made more dense in order to increase the density at which recording is done. So it is possible that even small track deviation will cause the occurrence of cross talk between the current track and a track adjacent thereto. For that reason, in order to accurately control focusing or tracking, it has strongly been demanded to accurately correct the normalization error of the normalization circuit. However, a correction method that enables accurate correction of the normalization error is not known.

DISCLOSURE OF INVENTION

In view of the above-described circumstances, an object of the present invention is to provide a correction method that enables accurately correcting an error of a normalization circuit, a correction circuit that corrects the error by using the correction method, and a light information storage apparatus which performs the correction.

The correction method of the present invention which attains the above object is the one which is adapted to use a normalization circuit including:

two input lines to which two signals are respectively input;

an addition section which adds offset signals to the two signals which have been respectively input to the two input lines;

a calculation section which divides the difference between the two signals to which the offset signals have been added in the addition section, by the sum of the two signals, to thereby perform normalization; and an output line which outputs a signal representing the result of the normalization which has been obtained through the calculation section, and to adjust the values of the offset signals of the normalization circuit to thereby correct the error of the normalization circuit, and that is characterized by including:

a same-signal pair input step frespectively inputting to the two input lines two signals of a same-signal pair which consists of the two signals each having the same signal waveform; and a difference-adjusting step adjusting the difference between the values of the two offset signals in the addition section to thereby make the value of the signal output from the output line of the normalization circuit, the two input lines thereof having input thereto the two signals of the same-signal pair, fixed or coincide with a predetermined value.

According to the correction method of the present invention, it is possible to correct the normalization circuit such that, when the values of the two signals input to the two input lines are equal to each other, the normalization circuit may always output an accurate value of "0". By using the normalization circuit that has been corrected in this way, it is possible to realize a high-accuracy control mechanism.

The correction method of the present invention suitably includes a fixed-ratio-signal pair input step inputting to the two input lines, after the difference-adjusting step, two signals of a fixed-ratio-signal pair which consists of the two signals in which the ratio between the amplitudes of waveforms is fixed; and an offset value-adjusting step adjusting each of the two offset signals while the difference between the values of the two offset signals is maintained as is, to thereby make the value of the signal output from the output line of the normalization circuit, the two input lines thereof having input thereto the two signals of the fixed-ratio-signal pair, fixed or coincide with a predetermined value.

By passing through the offset value-adjusting step, the normalization circuit is corrected so as to always output an accurate value regardless of the values of the signals which have been input thereto. By using the normalization circuit which has been corrected in this way, it is possible to realize a highly stable control mechanism.

In a case where the addition section of the normalization circuit is the one which can set the values of the offset signals only once, the correction method of the present invention is characterized in that each of the difference-adjusting step and offset value-adjusting step uses, in substitution for the addition section, a replacement adder which adds the offset signals in place of the addition section;

the method including:

an offset value-setting step setting the values of the offset signals in the addition section such that they may have the same values as those of the offset signals to which adjustment has been made by the replacement adder being used in the offset value-adjusting step.

By the correction method as described above, it is possible to set the values of the offset signals of the addition section to appropriate values.

The correction circuit of the present invention is adapted to use a normalization circuit including:

two input lines to which two signals are respectively input;

an addition section which adds offset signals to the two signals which have been respectively input to the two input lines;

a calculation section which divides the difference between the two signals that the offset signals have been added in the addition section, by the sum of the two signals, to thereby perform normalization; and an output line which outputs an analog signal representing the result of the normalization which has been obtained through the calculation section, and to adjust the values of the offset signals of the normalization circuit to thereby correct the error of the normalization circuit, and is characterized by including:

a testing signal input section which inputs testing signals to the two input lines; and an adjusting section which adjusts the values of the offset signals in the addition section correspondingly to the value of the signal output from the output line, wherein the testing signal input section is the one wherein two signals of a same-signal pair consisting of the two testing signals each have the same signal waveform, and wherein the adjusting section which adjusts the difference between the values of the two offset signals in the addition section, to thereby make the value of the signal output from the output line of the normalization circuit, the two input lines thereof having input thereto the two signals of the same-signal pair, fixed or coincide with a predetermined value.

The light information storage apparatus which attains the above object is the light information storage apparatus which is adapted to access a predetermined information storage medium by using a light, and which is characterized by including:

a light emission section which emits a light;

a condenser section which causes a light emitted by the light emission section to be focused onto the surface of the predetermined information storage medium;

a light reception section which divides the light reflected by the information storage medium into a plurality of light rays and thereby outputs a plurality of reception light signals;

a normalization circuit that receives two sets of signals input via two input lines respectively, the two signals being obtained by adding up for each of two sets of signals the plurality of reception light signals output from the light receiving section and classified into the two sets of signals, adds offset signals respectively to the two signals input to the two input lines, divides by the sum of the two signals the difference between the two signals to which the offset signals have been added to thereby perform normalization, and outputs the signal representing the result of the normalization from an output line thereof;

a control section which controls the condenser section according to the signal output from the normalization circuit via the output line thereof; and an adjusting section which, with two signals of a same-signal pair consisting of two signals each having the same signal waveform being input to the normalization circuit via the two input lines, adjusts the difference between the values of the two offset signals in the normalization circuit to thereby make the value of the signal output from the output line fixed or coincide with a predetermined value.

Incidentally, although regarding the correction circuit and light information storage apparatus of the present invention only the ones each of which has the basic form is illustrated, this is for the purpose of avoiding the duplex description. The correction circuit and light information storage apparatus of the present invention include not only the above-described correction circuit and light information storage apparatus having the basic form but also the correction circuit and light information storage apparatus having various kinds of forms which correspond to the respective forms of the correction method of the present invention.

BEST MODE FOR CARRYING OUT THE INVENTION

Hereinafter, firstly a comparative example, and then an embodiment of the present invention will be described.

Figure 1:
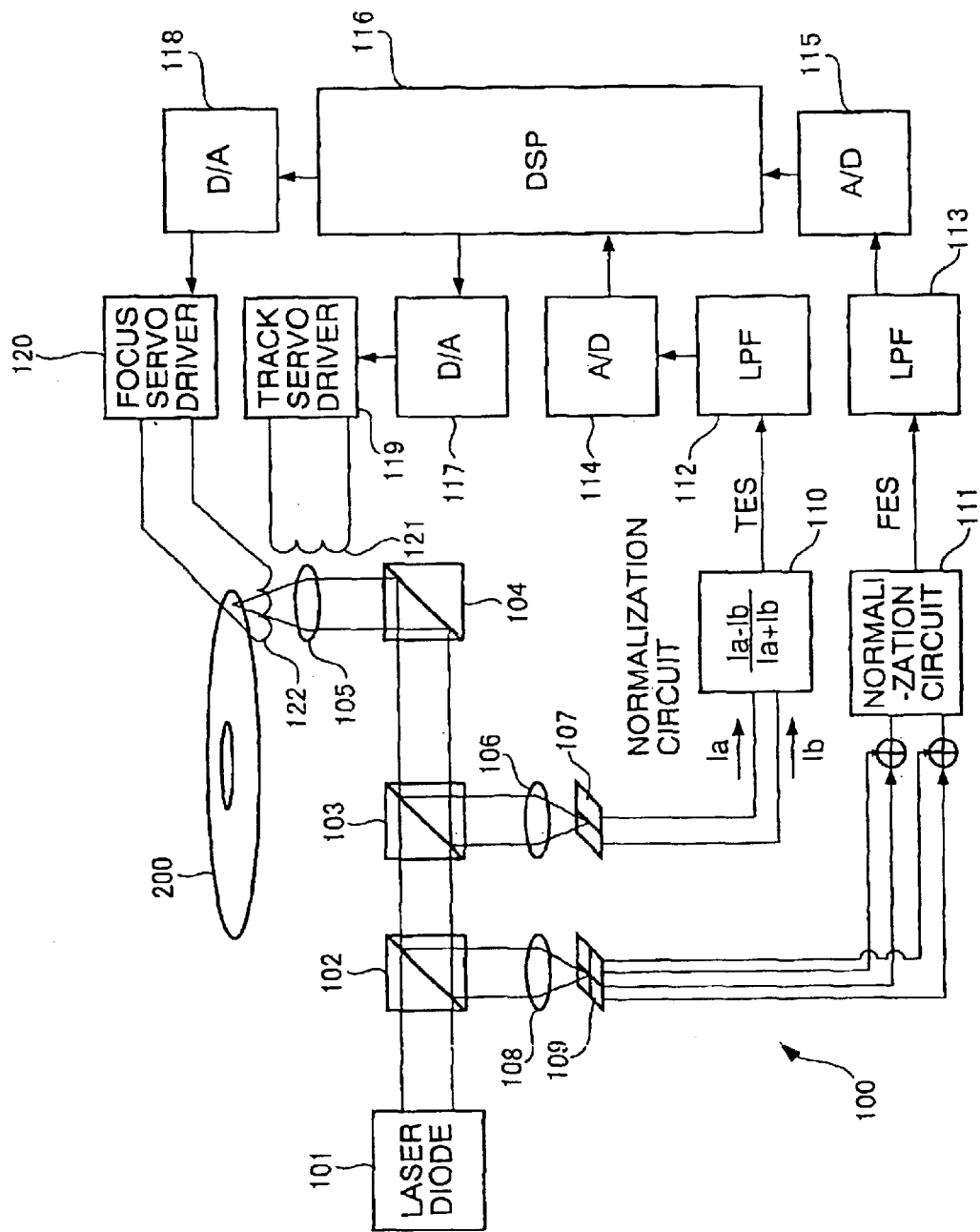
FIG. 1 is a view illustrating a comparative example of a light information storage apparatus.

FIG. 1 is a view illustrating a comparative example of a light information storage apparatus.

This light information storage apparatus 100 uses an optical disk 200 the information of which is recorded and reproduced by means of a light, as an information storage medium. The optical disk 200 is retained at a predetermined position within the light information storage apparatus 100 and is rotated at a predetermined rotation speed.

The light information storage apparatus 100 is equipped with a laser diode 101 and there is emitted therefrom a laser light having a predetermined intensity. The laser light sequentially passes through a first beam splitter 102, a second beam splitter 103, and a reflection prism 104 and then enters a condenser lens 105. Then the laser light is condensed onto the optical disk 200 by the condenser lens 105. The optical disk 200 having the laser light condensed thereon gives forth a reflected light corresponding to the information recorded on the optical disk 200.

The reflected light which has occurred from the optical disk 200 passes through the condenser lens 105 and the reflection prism 104 and reaches the second beam splitter 103, in which part of the reflected light is reflected.

The light which has been reflected by the second beam splitter 103 passes through a lens 106 and reaches a light-receiving surface of a 2-divided photodetector 107. The 2-divided photodetector 107 receives the light, which has impinged upon the light-receiving surface, in the form of its being divided into two parts. It thereby outputs two reception-light signals.

On the other hand, the light which has passed through the second beam splitter 103 is reflected by the first beam splitter 102, passing through a lens 108 and reaching a light-receiving surface of a 4-divided photodetector 109. The 4-divided photodetector 109 receives the light, which has impinged upon the light-receiving surface, in the form of its being divided into four parts. It thereby outputs four reception-light signals.

This light information storage apparatus 100 of FIG. 1 has equipped therein a first normalization circuit 110 and a second normalization circuit 111. The first normalization circuit 110 receives two reception-light signals which are output from the 2-divided photodetector 107 and performs normalization by dividing the difference signal thereof by the sum signal thereof, to thereby obtain a track error signal. The second normalization circuit 111 receives two composite signals, each obtained by adding two out of the four reception-light signals output from the 4-divided photodetector 109. And it performs normalization by dividing the difference signal of those two composite signals by the sum signal thereof, to thereby obtain a focus error signal.

The track error signal and focus error signal which have been obtained by the first normalization circuit 110 and second normalization circuit 111 have their high-frequency noises eliminated respectively by low-pass filters 112 and 113 and then are digitized respectively by A/D conversion circuits 114 and 115. Thereby, the resulting track error signal and focus error signal are input to a DSP (Digital Signal Processor) 116.

The DSP 116 produces control signals for controlling tracking and focusing such that the track error signal and focus error signal each are zero. The control signals which have been produced by the DSP 116 are analogized by D/A conversion circuits 117 and 118, respectively, and are input to a track servo driver 119 and focus servo driver 120.

The track servo driver 119 moves a lens actuator 121 for using track servo in corresponding relationship to the control signal to thereby control the position of the condenser lens 105 in a direction going along the surface of the optical disk 200. On the other hand, the focus servo driver 120 moves a lens actuator 122 for using focus servo in corresponding relationship to the control signal to thereby control the position of the condenser lens 105 in a direction going toward or going away from the surface of the optical disk 200.

The controlled result of the position of the condenser lens 105 has an effect upon the reflected light that occurs from the optical disk 200 and also upon the track error signal and focus error signal, thereby the controlled result is fed back to the DSP 116.

Next, regarding the above-described two normalization circuits, a description thereof will be made by taking up the first normalization circuit 110 as a representative example.

Figure 2:
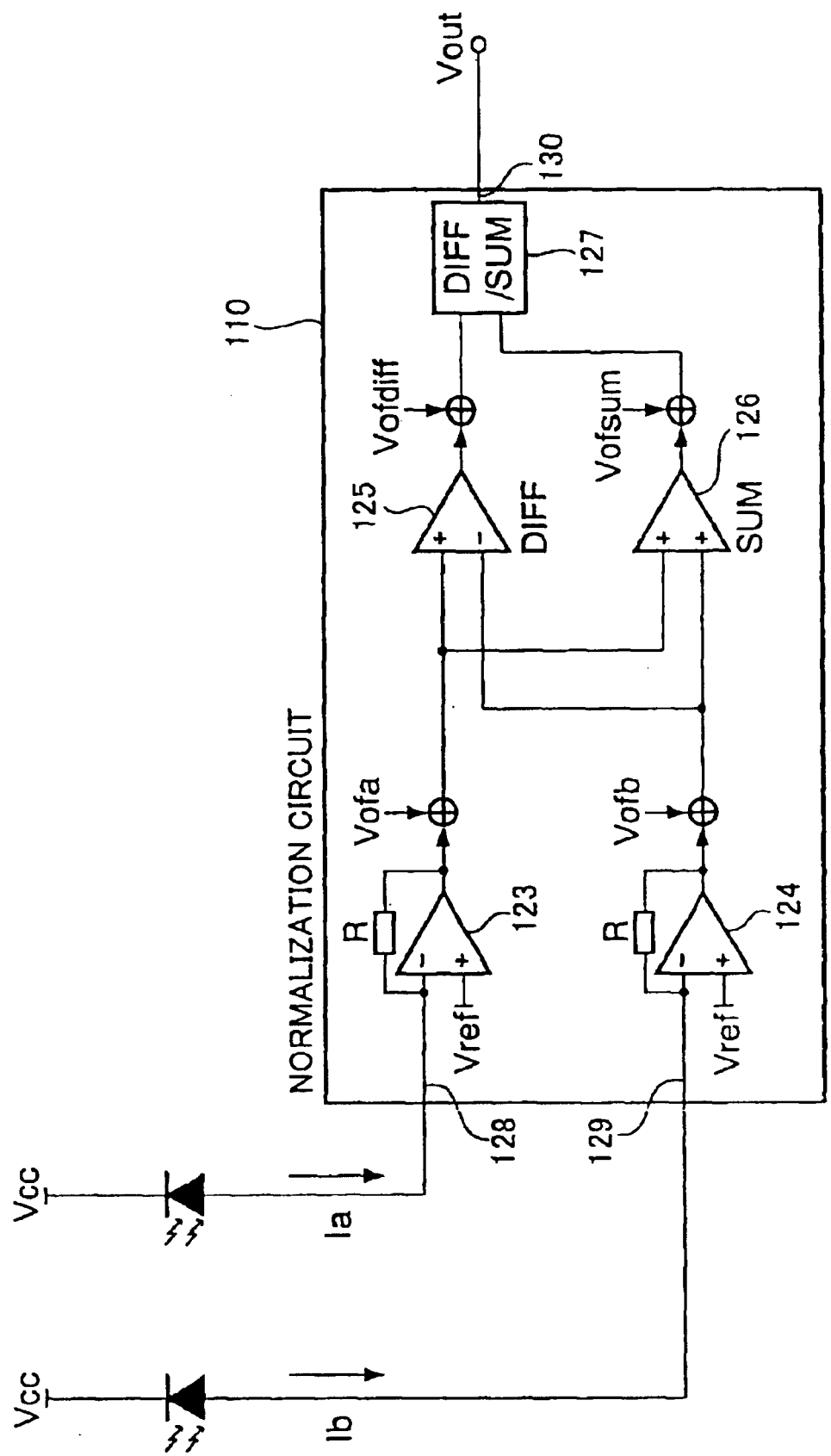
FIG. 2 is a construction view of a normalization circuit equipped in the comparative example of the light information storage apparatus.

FIG. 2 is a construction view of a normalization circuit equipped in a comparative example of the light information storage apparatus.

In this normalization circuit 110, there are equipped two current/voltage conversion circuits 123, 124, subtraction circuit 125, addition circuit 126, and division circuit 127. Into the current/voltage conversion circuits 123, 124, there are respectively input via two input lines 128, 129 electric current signals Ia, Ib, each of which is converted to a corresponding one of voltage signals with a conversion rate of R. In the subtraction circuit 125, one of those voltage signals is subtracted from the other of them, thereby the difference signal is obtained. Those voltage signals are added together in the addition circuit 126, thereby the sum signal is obtained. In the division circuit 127, the difference signal is divided by the sum signal, thereby normalization is performed, and a voltage signal Vout which represents that normalization result is output via an output line 130.

Here, the voltage signals, which the respective electric current signals Ia, Ib have been converted to, the difference signal and the sum signal, respectively, have made therein predetermined errors Vofa, Vofb, Vofdiff, and Vofsum. These errors Vofa, Vofb, Vofdiff, and Vofsum respectively have constant values specific for this normalization circuit 110.

In a case where the above-described errors do not exist, the output signal Vout of the normalization circuit is expressed by the equation which follows.

$$Vout=(Ia{\times}R-Ib{\times}R)/(Ia{\times}R+Ib{\times}R)=(Ia-Ib){\times}R/(Ia+Ib){\times}R=(Ia-Ib)/(Ia+Ib) \quad (1)$$

If the above-described respective errors exist, the output signal Vout is expressed by the equation which follows.

$$Vout=\{(Ia{\times}R+Vofa)-(Ib{\times}R-Vofb)+Vofdiff\}/\{(Ia{\times}R+Vofa)+(Ib{\times}R+Vofb)+Vofsum\}=\{(Ia{\times}R-Ib{\times}R)+Vofa-Vofb+Vofdiff\}/\{(Ia{\times}R+Ib{\times}R)+Vofa+Vofb+Vofsum\} \quad (2)$$

Here, introducing the constants $\alpha$ and $\beta$ which follow, $$\alpha=(Vofa-Vofb+Vofdiff)/R$$

$$\beta=(Vofa+Vofb+Vofsum)/R$$

the equation (2) is rewritten as follows.

$$Vout=\{(Ia-Ib)+\alpha\}/\{(Ia+Ib)+\beta\} \quad (3)$$

As stated above, the optical disk 200 of FIG. 1 is the one into or from which information is recorded or reproduced through the use of light. When reproducing, a weak light whose intensity is low enough not to destroy the information that is recorded is radiated onto the optical disk 200. For this reason, it is possible that there will occur a case where the levels of the electric current signals input to the normalization circuit are so low that the sum (Ia+Ib) of those electric current signals in terms of the level is much smaller than the constant $\beta$. In that case, the equation (3) above is approximated to the equation (3') that follows.

$$Vout=\{(Ia-Ib)+\alpha\}/\beta \quad (3')$$

Namely, there occurs the phenomenon that the difference signal to be normalized is output substantially as is without being normalized. For this reason, when the intensity of the laser light is varied between with respect to the inner periphery of the medium and with respect to the outer periphery of it, or when the intensity of the laser light is varied in harmony with the environmental conditions, the level of the track error signal or focus error signal inconveniently varies. In addition, the feedback sensitivity also inconveniently varies. Therefore, it is difficult to maintain the high-accuracy control permanently as it is.

Also, essentially, when the difference (Ia−Ib) between the electric current signals is "0", the track error signal, etc. must also be "0". However, in that case, the equation (3) above becomes as follows.

$$Vout=\alpha/\{(Ia+Ib)+\beta\} \quad (3'')$$

Namely, in that case, the output error corresponding to the sum (Ia+Ib) of the electric current signals occurs.

Figure 3:
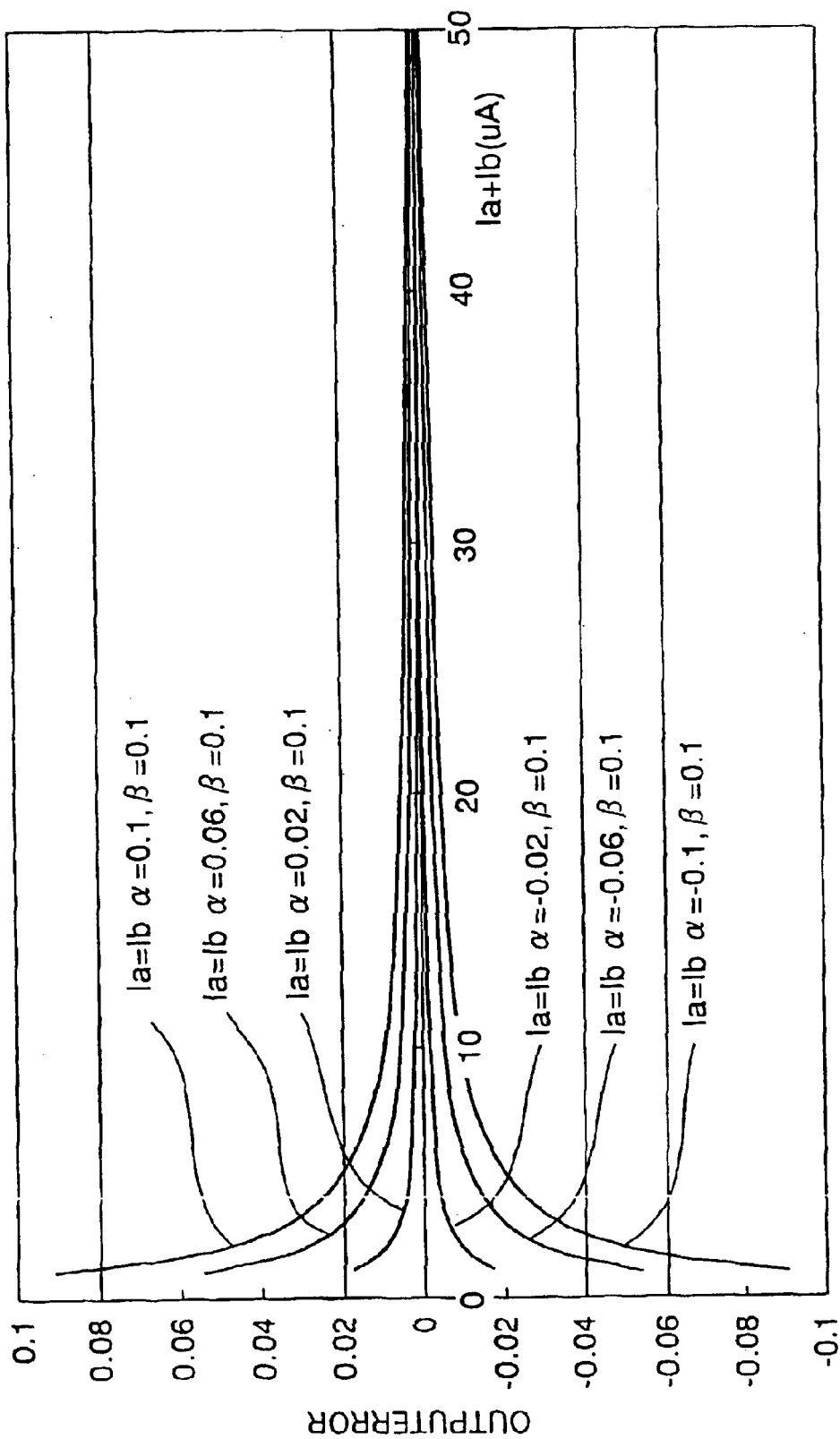
FIG. 3 is a graph illustrating an output error.

FIG. 3 is a graph illustrating an output error.

The abscissa axis of the graph of FIG. 3 represents the sum (Ia+Ib) of the electric current signals and the ordinate axis thereof represents the output error.

It is seen that, as the sum (Ia+Ib) of the electric current signals becomes small, the output error becomes large.

When the output error as illustrated in the graph of FIG. 3 occurs, it results that the condenser lens 105 illustrated in FIG. 1 is retained in the position which is deviated from the position which would if otherwise be situated. This causes the occurrence of cross talk, or out-of-focus, phenomena. Also, when the intensity of the laser light has been changed over from a weak light for using reading-out to a strong light for using writing-in, despite the fact that no change is made of the track position of the condenser lens, the track error signal rapidly increases. On that account, the tracking control system outputs an excessively high value of torque in its attempt to follow that rapid increase in the track error signal. So there is the fear of the oscillation's or track deviation's taking place. Even in a case where no such oscillation or track deviation has taken place, the deviation between the write-in position of the information and the read-out position of the information occurs. So there is the fear that the quality of the reproduction information deteriorates.

As the method of solving those problems, the use of a technique of correcting the error, for example, by incorporating a correction circuit for executing signal processing of the output signal into a stage succeeding the normalization circuit 110 of FIG. 2 is thought effective. However, such type of correction circuit needs to execute complex signal processing that corresponds to the levels of the signals input to the normalization circuit.

Also, a technique of directly correcting a respective one of the above-described errors Vofa, Vofb, Vofdiff, and Vofsum is thought effective. However, in the normalization circuit which is already converted into an IC version, it is impossible to measure the respective errors Vofa, Vofb, Vofdiff, and Vofsum and directly correct a respective one of them.

With the above-described problems taken into consideration, an embodiment of the present invention will hereafter be described.

Figure 4:
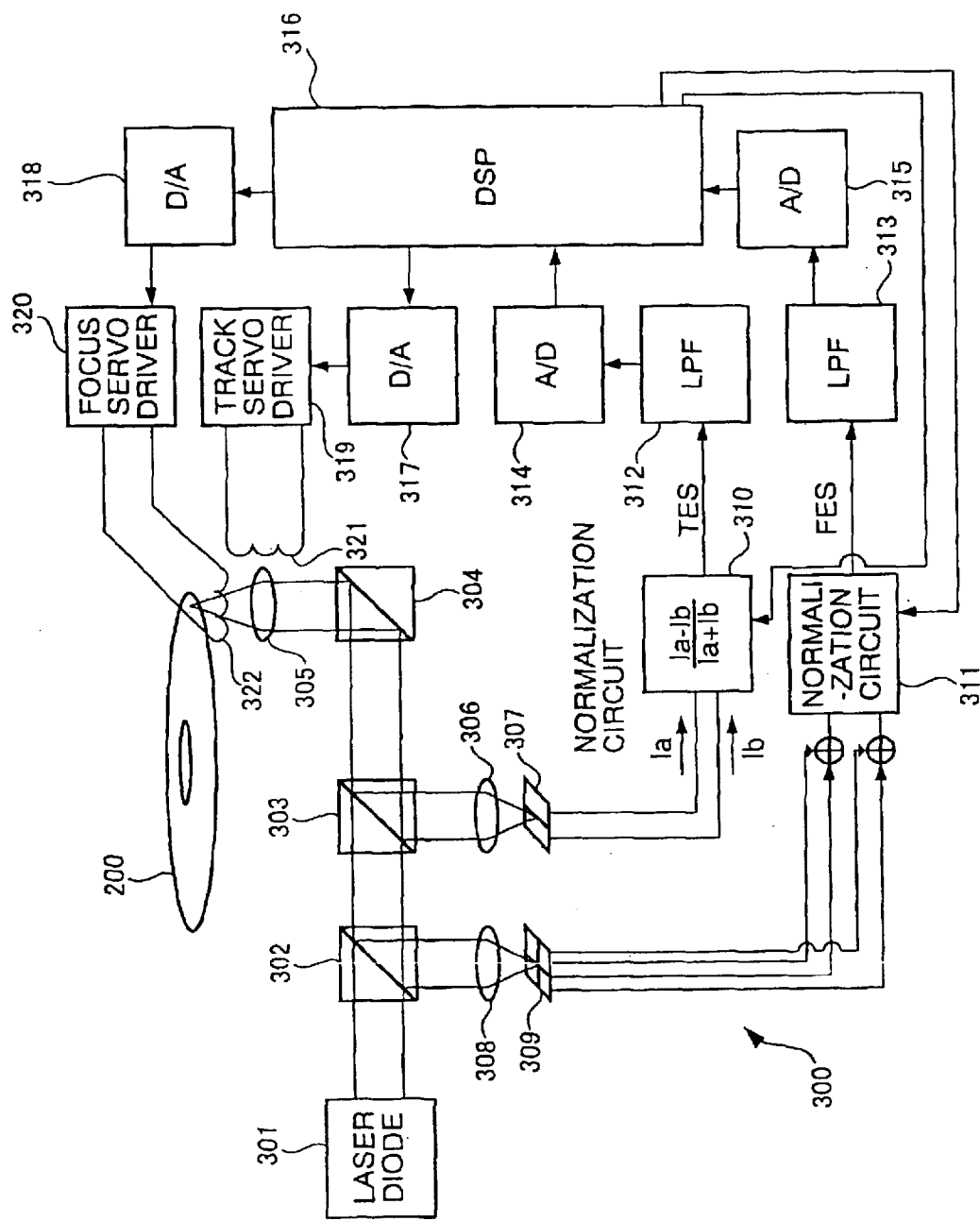
FIG. 4 is a view illustrating an embodiment of the light information storage apparatus of the present invention.

FIG. 4 is a view illustrating an embodiment of the light information storage apparatus of the present invention.

This light information storage apparatus 300 illustrated in FIG. 4 is the one that uses the optical disk 200 as in the case of the light information storage apparatus 100 illustrated in FIG. 1.

In the light information storage apparatus 300 illustrated in FIG. 4, there is equipped a laser diode 301 which is the same as the laser diode 101 illustrated in FIG. 1. The laser diode 301 is an example of the light emission section which is so referred to in the present invention.

Also, in the light information storage apparatus 300 illustrated in FIG. 4, there are equipped a first beam splitter 302, second beam splitter 303, reflection prism 304, and condenser lens 305 that are the same as the first beam splitter 102, second beam splitter 103, reflection prism 104, and condenser lens 105 illustrated in FIG. 1. The condenser 305 is an example of the condenser section that is so referred to in the present invention.

Also, in the light information storage apparatus 300 illustrated in FIG. 4, there are equipped a lens 306, 2-divided photodetector 307, lens 308, and 4-divided photodetector 309 which are the same as the lens 106, 2-divided photodetector 107, lens 108, and 4-divided photodetector 109 illustrated in FIG. 1. Respective ones of those 2-divided photodetector 307 and 4-divided photodetector 309 are examples of the light reception section which is so referred to in the present invention.

Further, in the light information storage apparatus 300 illustrated in FIG. 4, there are equipped D/A conversion circuits 317, 318, track servo driver 319, focus servo driver 320, and lens actuators 321, 322 which are the same as the D/A converter circuits 117, 118, track servo driver 119, focus servo driver 120, and lens actuators 121, 122 in FIG. 1. Those D/A converter circuits 317, 318, etc. and a DSP 316 as later described construct an example of the control section which is so referred to in the present invention.

On the other hand, in the light information storage apparatus 300 illustrated in FIG. 4, there are equipped, in place of the first normalization circuit 110 and second normalization circuit 111 illustrated in FIG. 1, a first normalization circuit 310 and second normalization circuit 311 which are examples of the normalization circuit so referred to in the present invention. Also, there are equipped low-pass filters 312, 313, A/D converter circuits 314, 315, and the DSP 316, as well, which are the same as the low-pass filters 112, 113, A/D converter circuits 114, 115, and DSP 116 in FIG. 1. Here, this DSP 316 serves as an example of the adjustment section which is so referred to in the present invention. It also corresponds to an embodiment of the correction circuit of the present invention, and executes an embodiment of the correction method of the present invention.

A description will hereafter be given of the embodiment of the correction circuit of the present invention incorporated into the light information storage apparatus 300 illustrated in FIG. 4. Also, a description will at the same time be given of the embodiment of the correction method of the present invention which is executed by the embodiment of the correction circuit. However, in the following description, the first normalization circuit 310 is used as a representative example of the two normalization circuits illustrated in FIG. 4.

Figure 5:
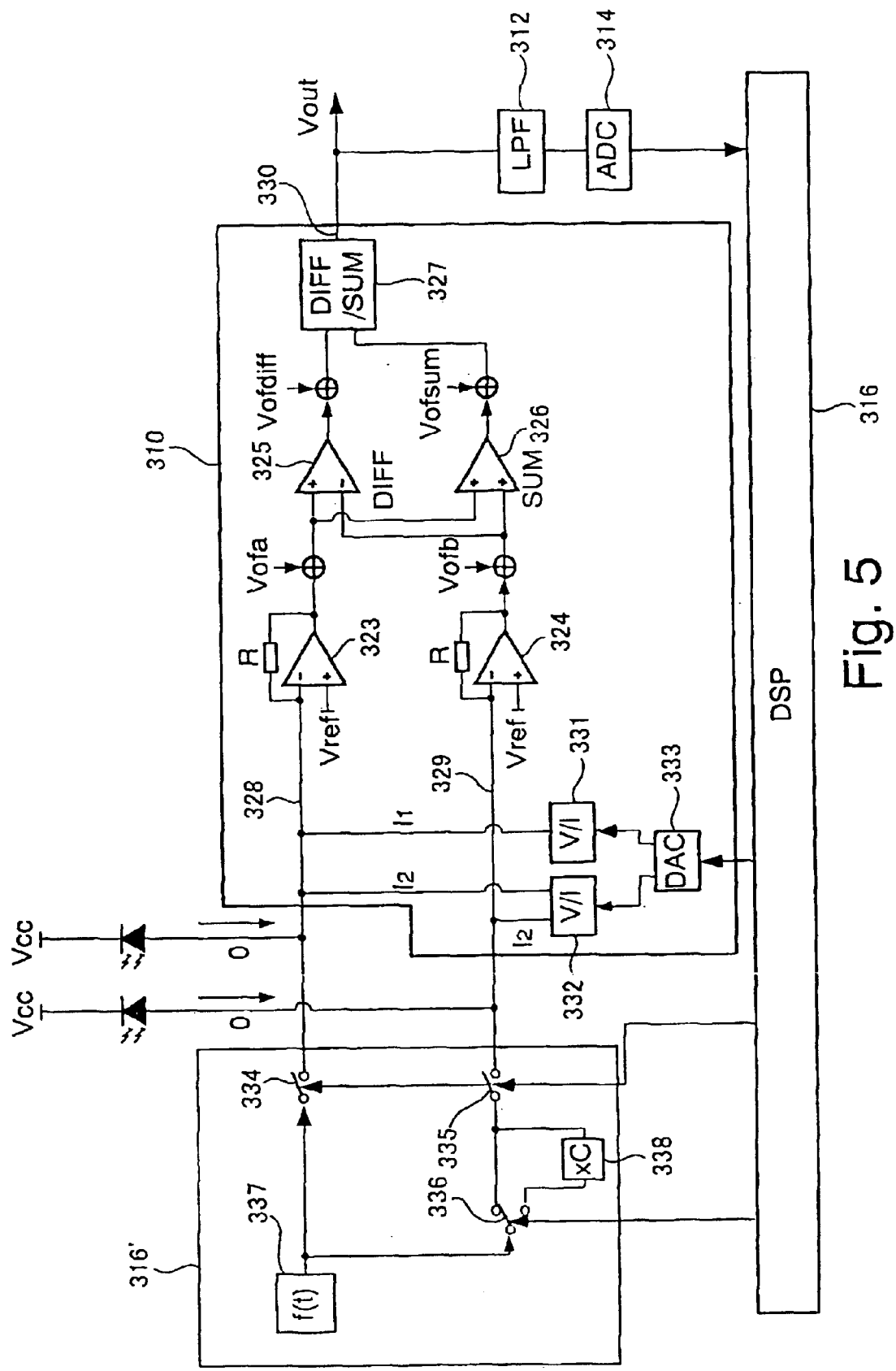
FIG. 5 is a detailed view illustrating a normalization circuit, and a portion neighboring upon it, of the light information storage apparatus.

FIG. 5 is a detailed view illustrating a normalization circuit, and a portion neighboring upon it, of the light information storage apparatus.

In this FIG. 5, there are illustrated the above-described normalization circuit 310, low-pass filter 312, A/D conversion circuit 314, and DSP 316 and there is also illustrated an equivalent circuit 316' representing part of the operation of the DSP 316.

In the normalization circuit 310, there are illustrated current-voltage conversion circuits 323, 324, subtraction circuit 325, addition circuit 326, division circuit 327, input lines 328, 329, and output line 330 which are the same as the current-voltage conversion circuits 123, 124, subtraction circuit 125, addition circuit 126, division circuit 127, input lines 128, 129, and output line 130 illustrated in FIG. 2. Among them, the subtraction circuit 325, addition circuit 326, and division circuit 327 constructs part of the calculation section that is so referred to in the present invention. In the current-voltage conversion circuits 323, 324, subtraction circuit 325, and addition circuit 326, as well, illustrated in FIG. 5, the above-described predetermined errors Vofa, Vofb, Vofdiff, and Vofsum are produced.

In the normalization circuit 310 illustrated in FIG. 5, there are equipped a first voltage-current conversion circuit 331, second voltage-current conversion circuit 332, and D/A conversion circuit 333. The voltage-current conversion circuits 331, 332 and D/A conversion circuit 333 construct part of the addition section which is so referred to in the present invention. The first voltage-current conversion circuit 331 inputs a first constant current signal $I_1$ to the input line 328 of the two input lines 328 and 329 while the second voltage-current conversion circuit 332 inputs a second constant current signal $I_2$ to both of the two input lines 328 and 329. The sum signal of those constant current signals $I_1$ and $I_2$ and the second constant current signal $I_2$ correspond to examples of the offset signals which are so referred to in the present invention. By the respective current values of the first and second constant current signals $I_1$ and $I_2$ being adjusted as described below, the error of the normalization circuit 310 is corrected.

Now, a correction method of correcting the error of the normalization circuit 310 will be described with reference to FIG. 5 and a relevant flow chart.

Figure 6:
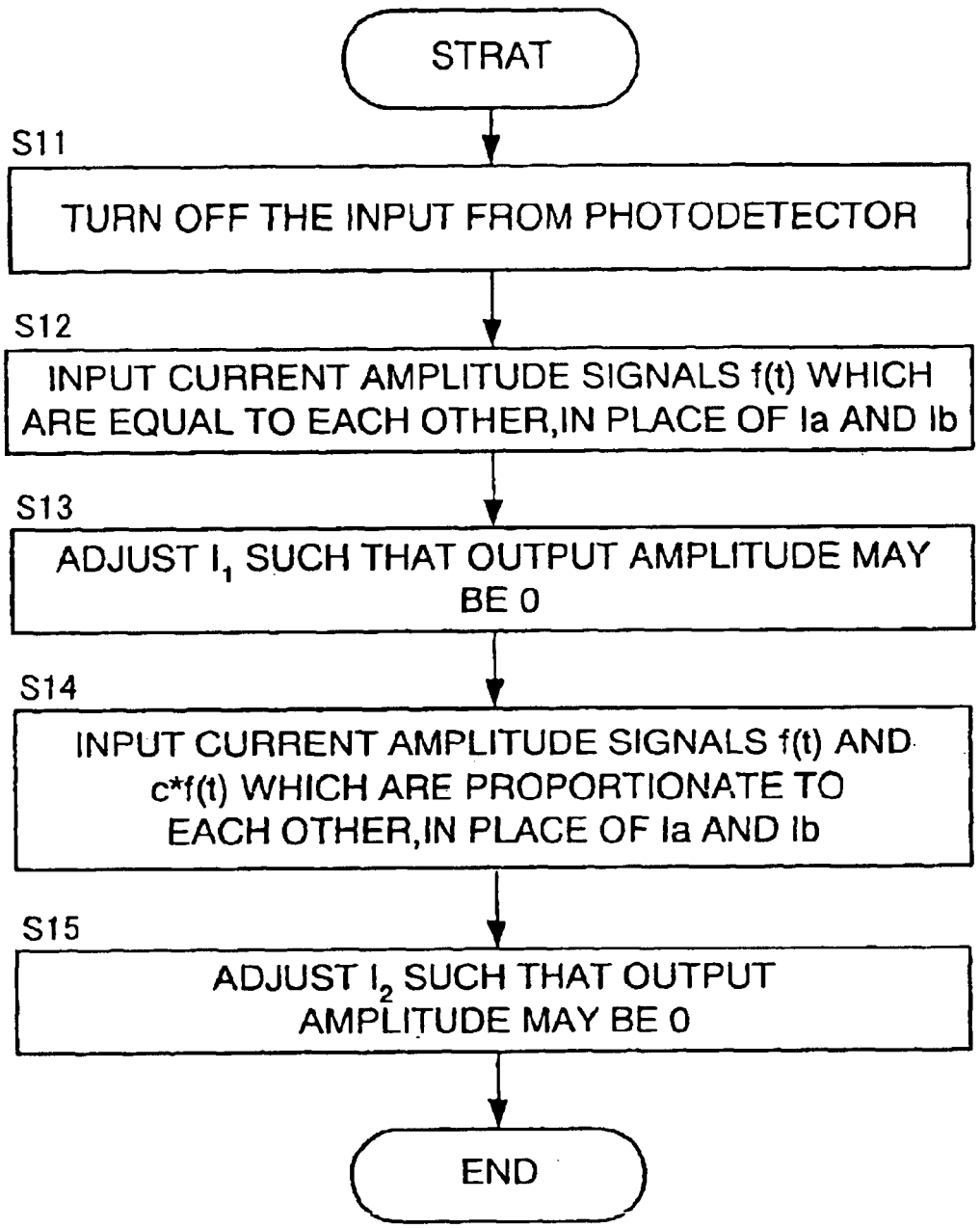
FIG. 6 is a flow chart illustrating an embodiment of a correction method of the present invention.

FIG. 6 is a flow chart illustrating an embodiment of the correction method of the present invention.

First, by the instruction made by the DSP 316, the emission of light from the laser diode 301 of FIG. 4, etc. are stopped, thereby the input of the light to the photodetector is stopped and the input signal from the photodetector is also stopped (step S11 of FIG. 6).

Next, two switches 334, 335 of the equivalent circuit 316' are each closed and a changeover switch 336 is set to a short-circuited side. In an amplitude signal generator 337, an amplitude signal f(t) having an appreciable value of amplitude is generated. By being set such that the respective switches 334, 335, and 336 of the equivalent circuit 316' is stated above, in place of the current signals output from the photodetector, the amplitude signal f(t) is input to both of the two input lines 328, 329 (step S12 of FIG. 6). The output Vout of the normalization circuit 310 which occurs at that time, by the following Ia, Ib being substituted into the equation (3) above, is determined as follows.

$$Ia = f(t) + I_1 + I_2$$

$$Ib = f(t) + I_2$$

$$\text{Vout} = \{(Ia - Ib) + \alpha\} / \{(Ia + Ib) + \beta\} = \{I_1 + \alpha\} / \{2 \times f(t) + 2 \times I_2 + I_1 + \beta\} \quad (4)$$

Since here the same amplitude signal f(t) is input to each of the two input lines 328, 329, the output Vout is the signal that the value must originally be "0". In this view, the DSP 316 not only monitors the output Vout via the low-pass filter 312 and A/D conversion circuit 314 but also adjusts the value of the first constant current signal $I_1$ via the D/A conversion circuit 333 and first voltage-current conversion circuit 331 such that the signal amplitude of the output Vout may be "0" and, thereby, the signal value thereof may become constant (step S13 of FIG. 6).

Figure 7:
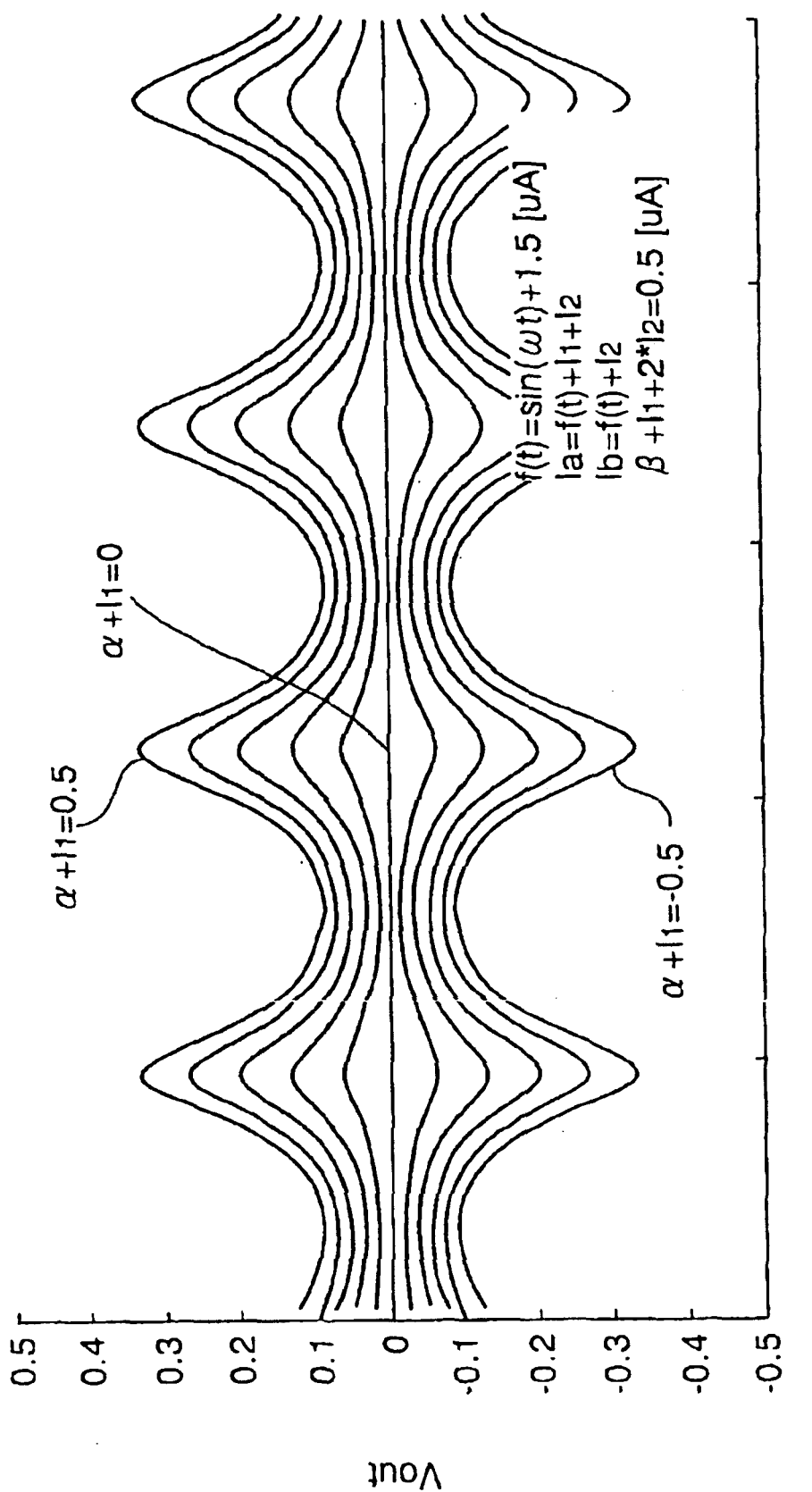
FIG. 7 is a graph illustrating the way in which the value of a first constant-current signal $I_1$ is adjusted.

FIG. 7 is a graph illustrating the way in which the value of the first constant-current signal $I_1$ is adjusted. In this graph, the abscissa axis represents the time and the ordinate axis represents the signal value of the output Vout.

Here, as one example of the amplitude signal f(t), a sine wave signal of f(t)=sin (ωt)+1.5 [μA] is used. When the value of the first constant current signal $I_1$ and the above-mentioned constant α have cancelled each other, i.e., when $I_1 = -\alpha$, the signal value of the output Vout becomes constant.

After the value of the first constant current signal $I_1$ has been adjusted as above, when the two switches 334 and 335 of the equivalent circuit 316' illustrated in FIG. 5 have each been opened and the signals from the photodetector are input, respectively, to the two input lines 328 and 329, if the signals from the photodetector are the same in level, the output Vout of the normalization circuit comes to have accurately a value of "0". For this reason, according to the output Vout of the normalization circuit, accurate control becomes possible. However, mere adjustment of only the first constant current signal $I_1$ doesn't correct the value of the output Vout which when the values of the signals input to the two input lines are different would be obtained. Therefore, under the circumstance where the signal level rapidly changes, stable control can not be realized.

Therefore, next, the value of the second constant current signal $I_2$ will be adjusted.

When adjustment of the value of the first constant current signal $I_1$ has been finished at the step S13 operation of FIG. 6, the changeover switch 336 of the equivalent circuit 316' illustrated in FIG. 5 is switched to the side on which the amplitude signal passes through a multiplying-by-constant-value circuit 338. By this, to one of the two input lines 328 and 329 there is input the amplitude signal f(t). To the other of them there is input a signal C×f(t) obtained by the amplitude signal f(t) being multiplied by the constant C (step S14 of FIG. 6). The output Vout of the normalization circuit 310 which occurs at that time, by the following Ia and Ib being substituted into the equation (3) above, is determined as follows.

$$Ia = f(t) - \alpha + I_2$$

$$Ib = C \times f(t) + I_2$$

$$Vout = \{(Ia-Ib)+\alpha\}/\{(Ia+Ib)+\beta\} = \{(1-C) \times f(t)\}/\{(1+C) \times f(t) + 2 \times I_2 - \alpha + \beta\} \quad (5)$$

Since here the two signals f(t) and C×f(t) the signal values of that are kept having a fixed value of ratio therebetween are input, respectively, to the two input lines 328, 329, the output Vout is the signal that the value must originally be "(1−C)/(1+C)". In this view, the DSP 316, as in the above case, not only monitors the output Vout but also adjusts the value of the second constant current signal $I_2$ via the D/A conversion circuit 333 and second voltage-current conversion circuit 332 such that the signal amplitude of the output Vout may be "0" and, thereby, the signal value thereof may become constant (step S15 of FIG. 6).

Figure 8:
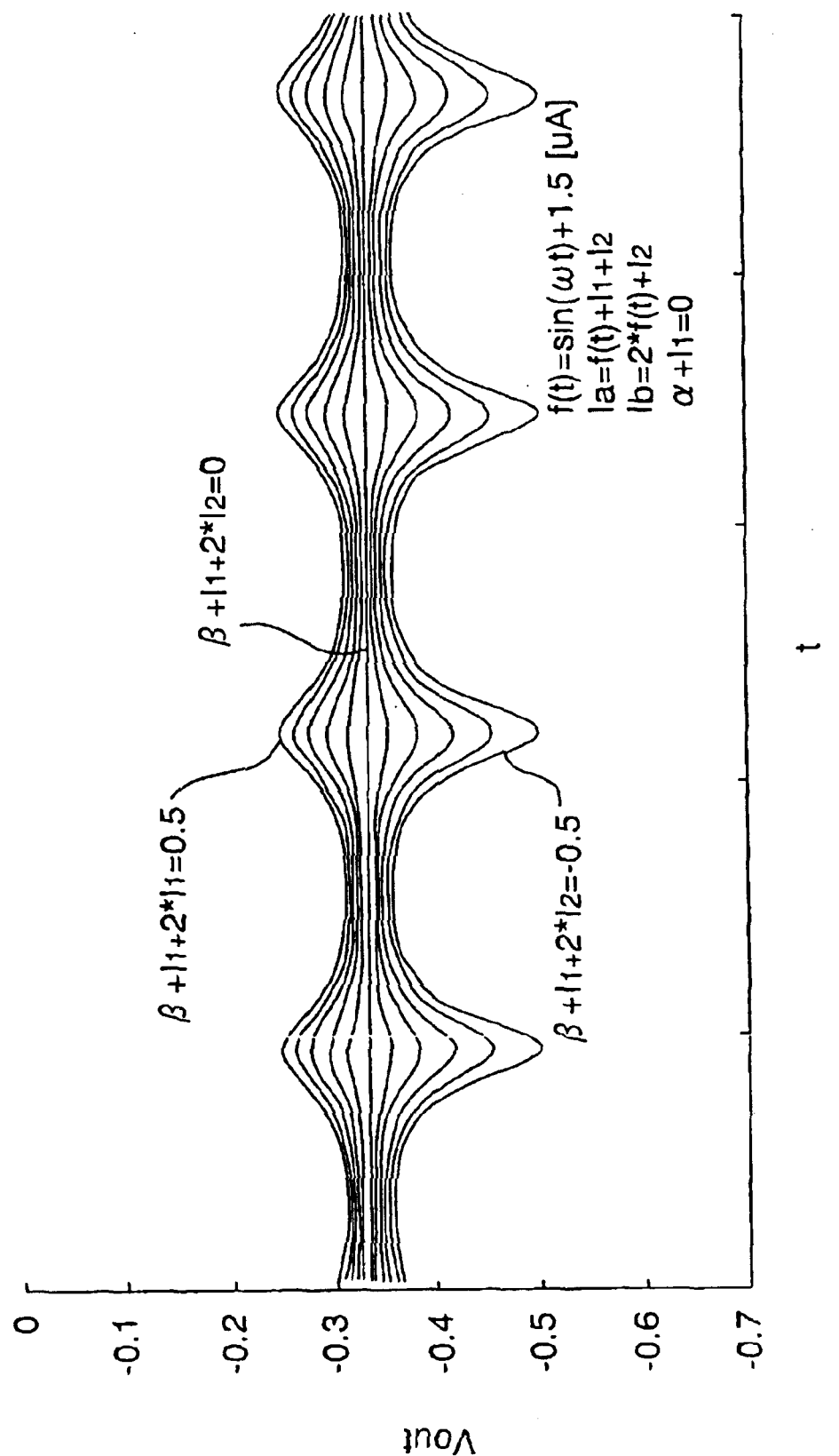
FIG. 8 is a graph illustrating the way in which the value of a second constant-current signal $I_2$ is adjusted.

FIG. 8 is a graph illustrating the way in which the value of the second constant-current signal $I_2$ is adjusted. In this graph, the abscissa axis represents the time and the ordinate axis represents the signal value of the output Vout.

Here, as well, as one example of the amplitude signal f(t), a sine wave signal of $f(t) = \sin(\Omega t) + 1.5$ [$\mu A$] is used. When $2 \times I_2 - \alpha + \beta = 0$, the signal value of the output Vout becomes constant.

As a result that the value of the second constant current signal $I_2$ has been adjusted like that, when, thereafter, the two switches 334, 335 of the equivalent circuit 316' illustrated in FIG. 5 are opened and, thereby, the signals from the photodetector are input, respectively, to the two input lines, even if the levels of the signals from the photodetector are different, regardless of those levels, the value of the output Vout indicates the exact result of the normalization calculation. Namely, substituting the following relationship into the equation (3) above with the signals from the photodetector being represented by Ia' and Ib', the output Vout is expressed as follows.

$$Ia = Ia' + I_1 + I_2$$

$$Ib = Ib' + I_2$$

$$I_1 = -\alpha$$

$$I_2 = (\alpha - \beta)/2$$

$$Vout = \{(Ia-Ib)+\alpha\}/\{(Ia+Ib)+\beta\} = (Ia'-Ib')/(Ia'+Ib')$$

As seen, the output Vout is accurately corrected. For this reason, even under the circumstance where the signal level rapidly changes, accurate control can be stably done according to that output Vout of the normalization circuit.

By the normalization circuit's, the output Vout of which has been accurately corrected in this way, being incorporated into the light information storage apparatus and the output Vout being used for positional control of the condenser lens, the condenser lens is retained at its accurate position, thereby accessing the information with a high accuracy becomes possible without causing the occurrence of the cross talk, or out-of-focus phenomenon. Also, since, in the light information storage apparatus having that normalization circuit incorporated thereinto, tracking is normally performed even when the intensity of the laser light has rapidly changed, the occurrence of the oscillation or the track deviation is avoided. And this enables recording and reproduction of a high quality of information.

Since almost no aged deterioration occurs in the above-described predetermined errors Vofa, Vofb, Vofdiff, and Vofsum, once the respective values of the first and second constant current signals have been adjusted, the signal values after adjustment are thereafter stored and used.

Incidentally, although, here, an amplitude signal pair is used as one example of the same-signal pair, or the fixed-ratio signal pair, that is so referred to in the present invention, the same-signal pair, or the fixed-ratio signal pair, that is so referred to in the present invention may be a stationary signal pair of which amplitude is "0". In a case where such stationary signal pair is used, since the output Vout always exhibits a fixed value, in the step S13 the value of the first constant current signal $I_1$ is adjusted such that the signal value of the output Vout may be "0" and in the step S15 the value of the second constant current signal $I_2$ is adjusted such that the signal value of the output Vout may have a value of "(1−C)/(1+C)".

Also, the normalization circuit so referred to in the present invention may be the one having equipped therein an addition section, as described below, for adding a constant voltage signal to the signals which have been input to the input lines.

Figure 9:
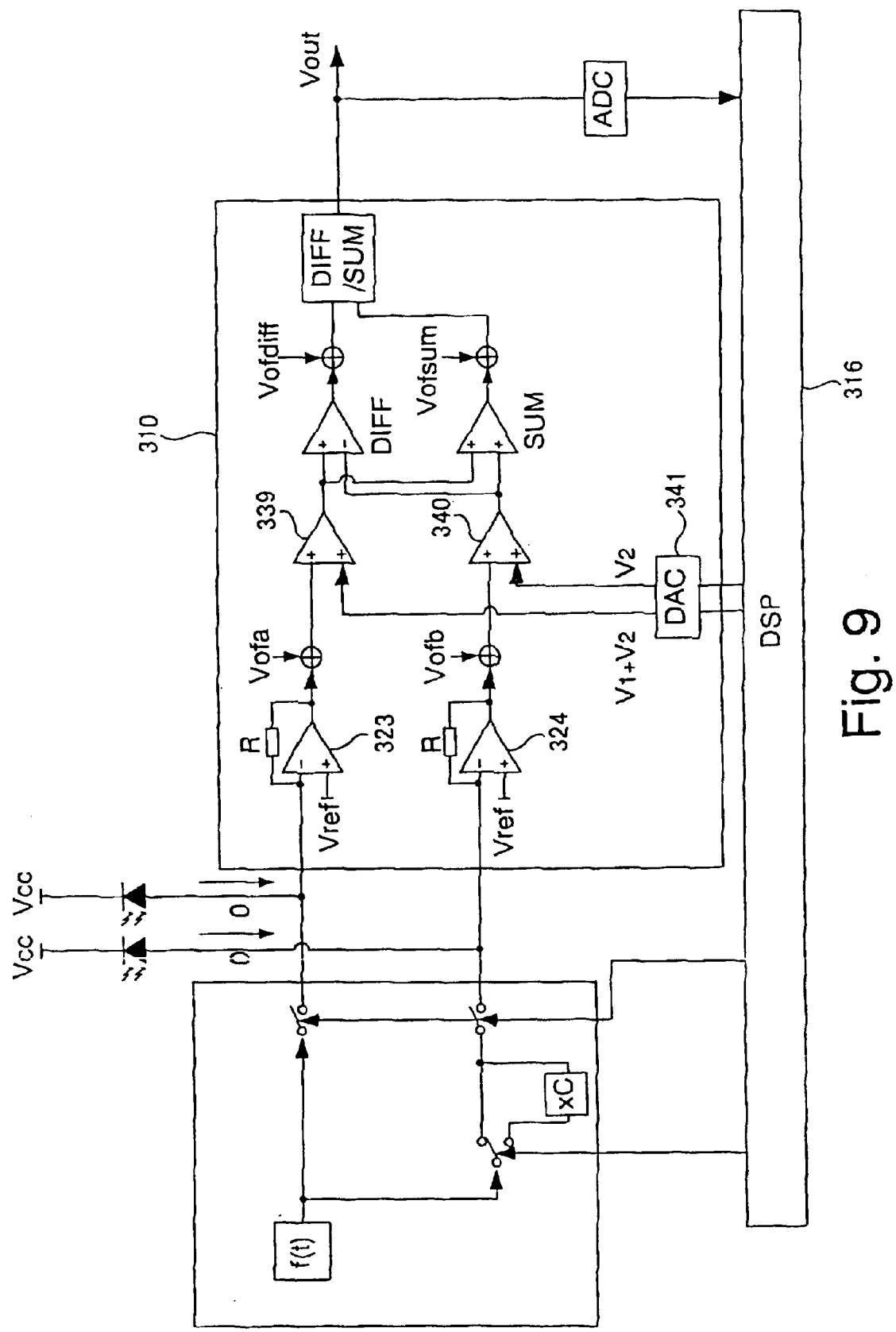
FIG. 9 is a view illustrating the normalization circuit that is equipped with an addition section for adding a constant-voltage signal.

FIG. 9 is a view illustrating the normalization circuit which is equipped with the addition section for adding a constant-voltage signal.

In this normalization circuit 310 illustrated in FIG. 9, there is equipped an addition section consisting of a first voltage addition circuit 339, second voltage addition circuit 340, and D/A conversion circuit 341, in place of the addition section consisting of the first voltage-current conversion circuit 331, second voltage-current conversion circuit 332, and D/A conversion circuit 333 illustrated in FIG. 5. This addition section illustrated in FIG. 9 is located at a stage which succeeds the current-voltage conversion circuits 323, 324 and is intended to add a constant voltage signal. The respective output values of the first and second voltage addition circuits 339, 340 are adjusted by the DSP 316 via the D/A conversion circuit 341. As a result of this, the first and second voltage addition circuits 339, 340 add the constant voltage signals $(V_1+V_2)$ and $V_2$ which have the relationship of $(V_1+V_2) = R \times (I_1+I_2)$ and $V_2 = R \times I_2$ with respect to the above-described constant current signals $I_1$ and $I_2$. By this, the addition section illustrated in FIG. 9 plays the same role as that of the addition section illustrated in FIG. 5.

Although in the above-described embodiment the values of the offset signals in the addition section are automatically adjusted, the correction method of the present invention permits the manual adjustment of the values of the offset signals in the addition section.

Figure 10:
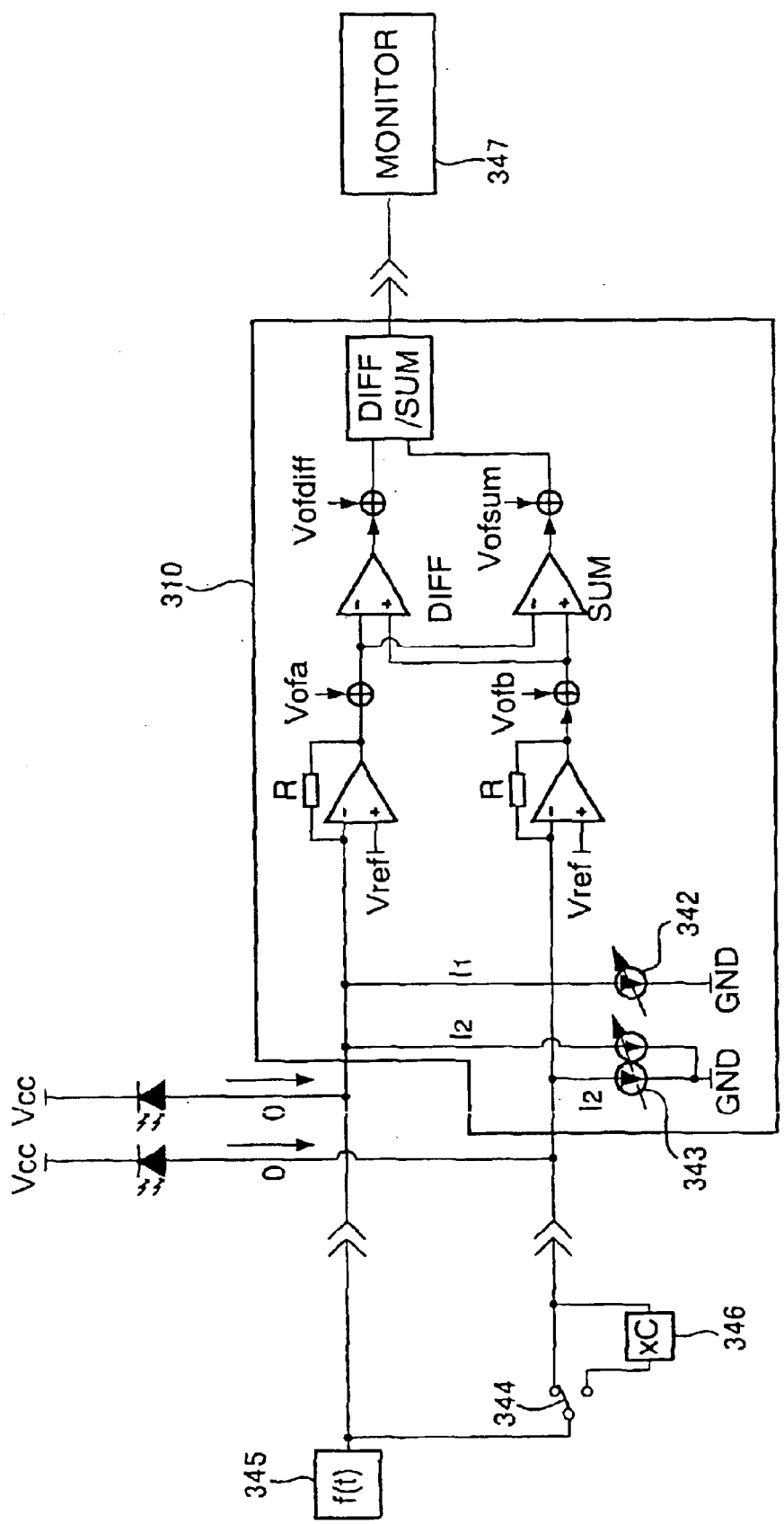
FIG. 10 is an explanatory view illustrating manual adjustment of the values of offset signals.

FIG. 10 is an explanatory view illustrating manual adjustment of the values of the offset signals.

The normalization circuit 310 illustrated in FIG. 10 has an addition section consisting of two variable resistors 342 and 343 in place of the addition section consisting of the first voltage-current conversion circuit 331, second voltage-current conversion circuit 332, and D/A conversion circuit 333 illustrated in FIG. 5. This normalization circuit 310 illustrated in FIG. 10 is, for example, the one which is already incorporated into the light information storage apparatus and which is shipped after the errors is corrected when the light information storage apparatus is manufactured.

When the error of the normalization circuit 310 illustrated in FIG. 10 is corrected, to the normalization circuit 310 there are removably connected a changeover switch 344, amplitude signal generator 345, and multiplying-by-fixed-value circuit 346 which play the roles the same as those of the changeover switch 336, amplitude signal generator 337, and multiplying-by-fixed-value circuit 338 illustrated in FIG. 5. Also, there is removably connected a monitor 347, as well, that visualizes the output of the normalization circuit 310. By the two variable resistors 342, 343 being adjusted by the method illustrated in FIG. 6 while referring to the output of the normalization circuit 310 visualized by the monitor 347, the error of the normalization circuit 310 is corrected.

The amplitude signal generator 345 and monitor 347 and the like become unnecessary after the error of the normalization circuit 310 has been corrected and, therefore, by being removed away from the normalization circuit 310, can be utilized for correction of another normalization circuit.

The correction method of the present invention is very effective when it is executed in the testing process when the normalization circuit which has been converted into an IC version is manufactured.

Figure 11:
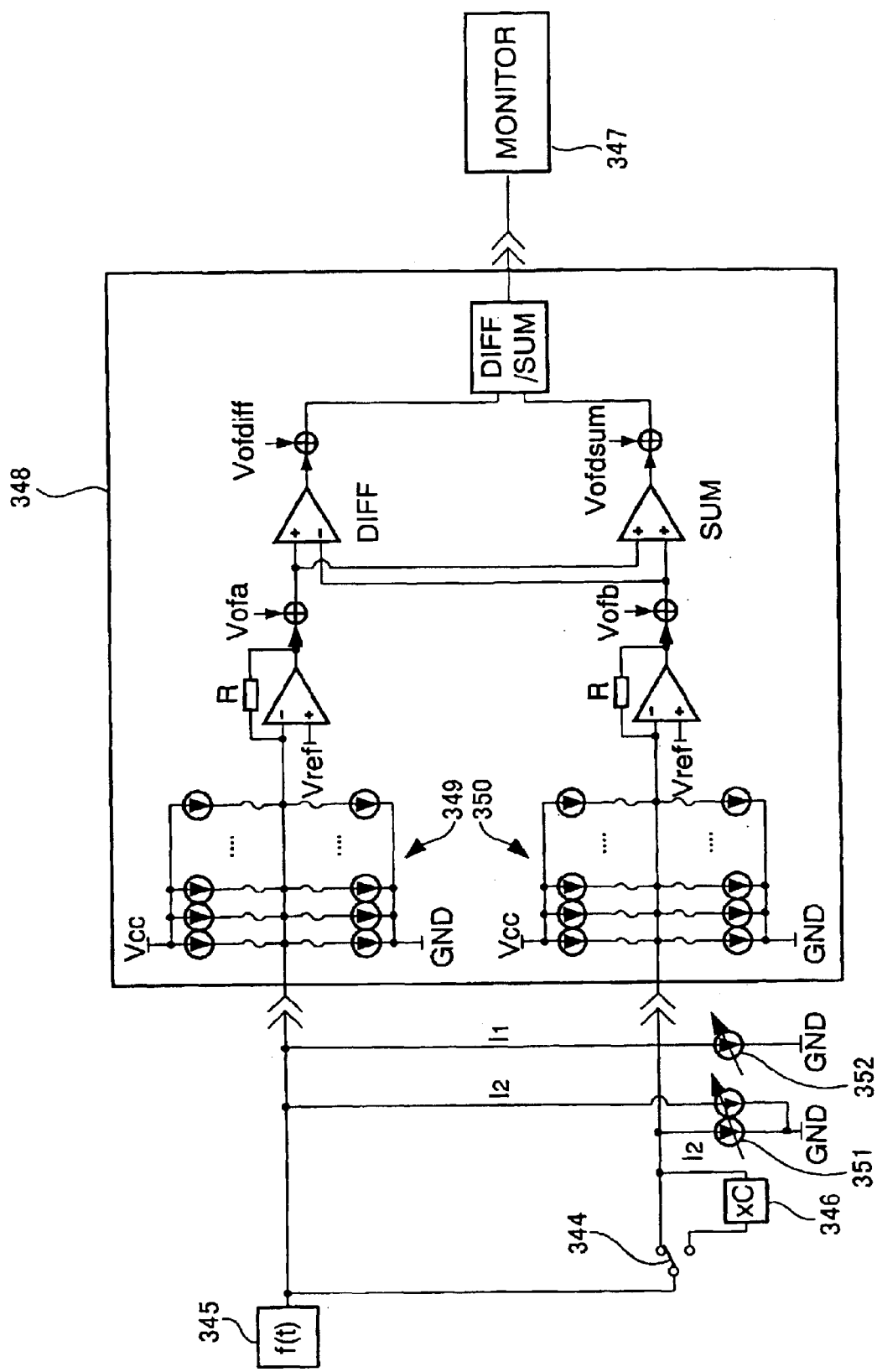
FIG. 11 is an explanatory view illustrating the correction of the error of the normalization circuit that has been converted into an IC version.

FIG. 11 is an explanatory view illustrating the correction of the error of the normalization circuit which has been converted into an IC version.

The normalization circuit 348 illustrated in FIG. 11 is a circuit which is equivalent to the normalization circuit 310 illustrated in FIG. 5 excepting that the addition section consists of two constant-current circuit groups 349, 350 and that circuit is the one which has been converted into an IC version.

When the error of the normalization circuit 348 is corrected, first, a replacement adder consisting of two variable resistors 351, 352 which add the constant-current signals in place of the two constant-current circuit groups 349, 350, the above-described changeover switch 344, the amplitude signal generator 345, and the multiplying-by-fixed-value circuit 346 are removably connected to the normalization circuit 348. Also, to the normalization circuit 348 there is removably connected, too, the above-described monitor 347.

Next, by using the replacement adder consisting of the two variable resistors 351, 352 in place of the addition section consisting of the two constant-current circuit groups 349, 350, the respective values of the two constant-current signals are respectively adjusted with the correction method illustrated in FIG. 6, and those values are recorded.

After that, in the trimming step of the normalization circuit 348, the trimming fuses of the constant-current circuit groups 349, 350 are suitably cut away with a laser, thereby the offset current values $I_2$, $(I_1+I_2)$ are realized Finally, the replacement adder, monitor 347, etc. are removed away, thereby a normalization circuit 348 wherein the error is already corrected is obtained.

As a result that the correction method of the present invention has been adopted, the additional use of a pin for adjustment becomes unnecessary for the normalization circuit 348 which has been converted into an IC version.

Industrial Applicability

Incidentally, although the light information storage apparatus of the above-described embodiment is the one which uses an optical disk as the information storage medium, the light information storage apparatus of the present invention may be the one which uses another information storage medium such as a photo-magnetic disk if the apparatus is the one that performs the tracking control, etc. using the reflected light from the information storage medium. Also, the light information storage apparatus of the present invention may be the one for using reproduction only or the one enabling recording and reproduction.

What is claimed is:

1. A correction method being adapted to use a normalization circuit, including:
   two input lines to which two signals are respectively input;
   an addition section which adds offset signals to the two signals which have been respectively input to the two input lines;
   a calculation section which divides the difference between the two signals to which the offset signals have been added in the addition section, by the sum of the two signals, to thereby perform normalization; and
   an output line which outputs a signal representing the result of the normalization which has been obtained through the calculation section,
   and to adjust the values of the offset signals of the normalization circuit to thereby correct the error of the normalization circuit, comprising:
   a same-signal pair input step respectively inputting to the two input lines two signals of a same-signal pair that consists of the two signals each having the same signal waveform; and
   a difference-adjusting step adjusting the difference between the values of the two offset signals in the addition section to thereby make the value of the signal output from the output line of the normalization circuit, the two input lines thereof having input thereto the two signals of the same-signal pair, fixed or coincide with a predetermined value.

2. The correction method according to claim 1, comprising:
   a fixed-ratio-signal pair input step inputting to the two input lines, after the difference-adjusting step, two signals of a fixed-ratio-signal pair which consists of the two signals in which the ratio between the amplitudes of waveforms is fixed; and
   an offset value-adjusting step adjusting each of the two offset signals while the difference between the values of the two offset signals is maintained as is, to thereby make the value of the signal output from the output line of the normalization circuit, the two input lines thereof having input thereto the two signals of the fixed-ratio-signal pair, fixed or coincide with a predetermined value.

3. The correction method according to claim 1, wherein the addition section of the normalization circuit is the one which can set the values of the offset signals only once; and
   the difference-adjusting step uses, in substitution for the addition section, a replacement adder which adds the offset signals in place of the addition section; and
   the correction method comprises
   an offset value-setting step setting the values of the offset signals in the addition section such that they may have the same difference as that between the offset signals to which adjustment has been made by the replacement adder being used in the difference-adjusting step.

4. The correction method according to claim 2, wherein the addition section of the normalization circuit is the one which can set the values of the offset signals only once; and
   the difference-adjusting step and the offset value-adjusting step use, in substitution for the addition section, a replacement adder which adds the offset signals in place of the addition section; and
   the correction method comprises
   an offset value-setting step setting the values of the offset signals in the addition section such that they may have the same difference as that between the offset signals to which adjustment has been made by the replacement adder being used in the offset value-adjusting step.

5. A correction circuit being adapted to use a normalization circuit, comprising:

two input lines to which two signals are respectively input;

an addition section which adds offset signals to the two signals which have been respectively input to the two input lines;

a calculation section which divides the difference between the two signals to which the offset signals have been added in the addition section, by the sum of the two signals, to thereby perform normalization; and an output line which outputs an analog signal representing the result of the normalization which has been obtained through the calculation section, and to adjust the values of the offset signals of the normalization circuit to thereby correct the error of the normalization circuit, comprising:

a testing signal input section which inputs testing signals to the two input lines; and an adjusting section which adjusts the values of the offset signals in the addition section correspondingly to the value of the signal output from the output line, wherein the testing signal input section inputs two signals of a same-signal pair consisting of the two testing signals each have the same signal waveform, and wherein the adjusting section adjusts the difference between the values of the two offset signals in the addition section, to thereby make the value of the signal output from the output line of the normalization circuit, the two input lines thereof having input thereto the two signals of the same-signal pair, fixed or coincide with a predetermined value.

6. A light information storage apparatus being adapted to access a predetermined information storage medium by using a light, comprising:

a light emission section that emits a light;

a condenser section that causes a light emitted by the light emission section to be focused onto a surface of the predetermined information storage medium;

a light reception section that divides the light reflected by the information storage medium into a plurality of light rays and thereby outputs a plurality of reception light signals;

a normalization circuit that receives two sets of signals input via two input lines respectively, the two signals being obtained by adding up for each of two sets of signals the plurality of reception light signals output from the light receiving section and classified into the two sets of signals, adds offset signals respectively to the two signals input to the two input lines, divides by the sum of the two signals the difference between the two signals to which the offset signals have been added to thereby perform normalization, and outputs the signal representing the result of the normalization from an output line thereof; and an adjusting section which, with two signals of a same-signal pair consisting of two signals each having the same signal waveform being input to the normalization circuit via the two input lines, adjusts the difference between the values of the two offset signals in the normalization circuit to thereby make the value of the signal output from the output line fixed or coincide with a predetermined value.

* * * * *